(12) United States Patent
Conrad (10) Patent No.: US 9,128,958 B2
(45) Date of Patent: Sep. 8, 2015

(54) SYSTEMS, METHODS, AND MEDIA FOR PROVIDING A DIGITAL PHOTO ARCHIVE

(71) Applicant: Sean T Conrad, Brooklyn, NY (US)

(72) Inventor: Sean T Conrad, Brooklyn, NY (US)

( * ) Notice: Subject to any disclaimer, the term of this patent is extended or adjusted under 35 U.S.C. 154(b) by 175 days.

(21) Appl. No.: 13/681,846

(22) Filed: Nov. 20, 2012

(65) Prior Publication Data

US 2013/0129258 A1     May 23, 2013

Related U.S. Application Data

(60) Provisional application No. 61/562,415, filed on Nov. 21, 2011.

(51) Int. Cl.
*G06K 9/54*        (2006.01)
*G06F 17/30*      (2006.01)

(52) U.S. Cl.
CPC ................................ *G06F 17/30244* (2013.01)

(58) Field of Classification Search
USPC ................... 382/128, 232, 305; 707/201, 812
See application file for complete search history.

(56) References Cited

U.S. PATENT DOCUMENTS

2006/0271602 A1* 11/2006 Davis et al. ................... 707/201
2010/0262635 A1* 10/2010 Hambleton ................... 707/812

* cited by examiner

*Primary Examiner* — Duy M Dang
(74) *Attorney, Agent, or Firm* — Byrne Poh LLP

(57) ABSTRACT

Systems, methods, and media for providing a digital photo archive are provided. In some embodiments, systems for providing a digital photo archive are provided, the systems comprising: at least one hardware processor that: collects a plurality of photos from a plurality of sources; collects a plurality of pieces of information from the plurality of sources; determines whether one of the plurality of photos is presently stored in the archive; stores the one of the plurality of photos in the archive only if the one of the plurality of photos has been determined to not be presently stored in the archive; and indicates to a user that the one of the plurality of photos is a duplicate photo if it is determined that the one of the plurality of photos has been determined to be presently stored in the archive.

15 Claims, 6 Drawing Sheets

```
<file
        customerid="..."
        binary="..."
        hash="..."
        parentfilehas="..."
        filename=photo1.jpg"
        permissions="..."
        starred="..."
        etc.
>
        <information>
                <dateitem
                        id="..."
                        type"comment"
                        datecreated="..."
                        datemodified="..."
                        value="..."
                />

<dateitem
                        id="..."
                        type"tag"
                        datecreated=""
                        datemodified=""
                        value="..."
                />
        </information>
</file>
```

SYSTEMS, METHODS, AND MEDIA FOR PROVIDING A DIGITAL PHOTO ARCHIVE

CROSS REFERENCE TO RELATED APPLICATION

This application claims the benefit of U.S. Provisional Patent Application No. 61/562,415, filed Nov. 21, 2011, which is hereby incorporated by reference herein in its entirety.

FIELD OF THE INVENTION

The invention relates to an automated archival service for storing digital files of photos and information related to those photos over a network, (As used herein, "photos" may include or refer alternatively to videos and information related to those videos.) More particularly, the invention relates to systems and methods of updating an archive with additional photos and/or related, information.

BACKGROUND OF THE INVENTION

Large numbers of digital files of photos are being created and stored on many computers and devices (e.g., home computers, friends computers, digital cameras, mobile phones, etc.) and with many online social or image networking services (e.g., MySpace®, Flick®, and Facebook®). Not surprisingly, these photos are highly valued by those that created or received them.

Of equal value is the information related to the photos. This information may include, for example, where and when a photo was taken, who is in the photo, comments from loved ones, other related photos, various edits to the photo, designated album, and so on. This is analogous to what a person may do when organizing hardcopy photos. For example, after having a roll of film developed and receiving a packet of photos, a person may take the time to choose the photos most meaningful to them (e.g., photos that capture an important memory). They may then write on the back of the photo the date it was taken and who is in the photo. The photo may then be placed in an album for the coffee table. This related information is usually very important and often grows in value as time goes on. People who tragically lose their home and possessions to, for example, a fire, often say the family photographs are one of the few things that cannot be replaced.

With the onset of the digital age and the Internet, the rate at which photos and their related information are created has increased dramatically. However, without a method of saying these photos and the related information for future use, these collections become ephemeral. For example, large numbers of photos may be lost when users switch from one social network to another. Many photos also may be lost when a person replaces their old cell phone with a new smart phone.

Because of the ease with which digital files can be transferred, people often end up with multiple copies of their files on different computers with different related data, which makes management and long-term storage of those files problematic. Current manual methods of "backing up" these photo files involve downloading the files to a local computer. There is currently no known logic to capture, understand, and organize the collection relevant to the related information. The result is often multiple copies of prized photos stored in a random folder on a hard drive, which is just as unmanageable as scattered hardcopy photos found in drawers and shoe boxes throughout a house.

There is currently no known easy way of backing up copies of photos and related information should, for example, users abandon their current social networking or hosting service or have their online account compromised. If a person routinely backs up their photos from, e.g., their digital camera, cell phone, social network, and/or online photo service, they may very likely end up with four or more copies of every photo, many directories, and no cohesive collection of all the comments, tags, albums, and other information they have associated with the photos. In particular, no known photo archival service identifies whether a photo is a new submission or a copy of a photo already stored in the archive. Also, there is no known photo archival service that collects, stores, and associates with a single record in the archive related photo information received from multiple sources for a particular photo. That is, known archival services typically just create a new record for each piece of photo-related information received.

SUMMARY OF THE INVENTION

Systems, methods, and media for providing as digital photo archive are provided. In some embodiments, systems for providing a digital photo archive are provided, the systems comprising: at least one hardware processor that: collects a plurality of photos from a plurality of sources; collects a plurality of pieces of information from the plurality of sources; determines whether one of the plurality of photos is presently stored in the archive; stores the one of the plurality of photos in the archive only if the one of the plurality of photos has been determined to not be presently stored in the archive; and indicates to a user that the one of the plurality of photos is a duplicate photo if it is determined that the one of the plurality of photos has been determined to be presently stored in the archive.

In some embodiments, methods for providing a digital photo archive are provided, the methods comprising: collecting a plurality of photos from a plurality of sources; collecting a plurality of pieces of information from the plurality of sources; determining whether one of the plurality of photos is presently stored in the archive; storing the one of the plurality of photos in the archive only if the one of the plurality of photos has been determined to not be presently stored in the archive; and indicating to a user that the one of the plurality of photos is a duplicate photo if it is determined that the one of the plurality of photos has been determined to be presently stored in the archive.

In some embodiments, non-transitory computer-readable medium containing computer-executable instructions that, when executed by a processor, cause the processor to perform a method for providing a digital photo archive are provided, the method comprising: collecting a plurality of photos from a plurality of sources: collecting, a plurality of pieces of information from the plurality of sources; determining whether one of the plurality of photos is presently stored in the archive; storing the one of the plurality of photos in the archive only if the one of the plurality of photos has been determined to not be presently stored in the archive; and indicating to a user that the one of the plurality of photos is a duplicate photo if it is determined that the one of the plurality of photos has been determined to be presently stored in the archive.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Systems, methods, and media for providing a digital photo archive are provided.

In accordance with some embodiment, an archival service is provided that includes a central archive for a customer's photos and information related to the photos. As used herein, the word "photos" may include, or alternatively refer to, videos and information related to the videos. Once set up, archiving and organization of photos and their related information can be automatic. During collection of the photos and related information, the archival service can identify whether a photo is a new submission or a copy of a photo already in the archive. If the photo is a copy, no new record is created in the archive a duplicate photo is not stored in the archive). Related information from multiple sources for each photo can be collected, stored, and associated with a single record in the archive. If additional information is received regarding a photo that is already in the archive, that information can be appended to the existing record, and a new record need not be created. Photos can be collected from multiple sources, and can be copied back for subsequent viewing or storage to the same sources or other destinations, such as, for example, social networks, photo sharing services, a customer's computer, and/or any other suitable device. The entire archive also can be advantageously exported to other archiving services or digital media storage devices, such as, for example, DVD-ROM, for long term preservation.

Figure 1:
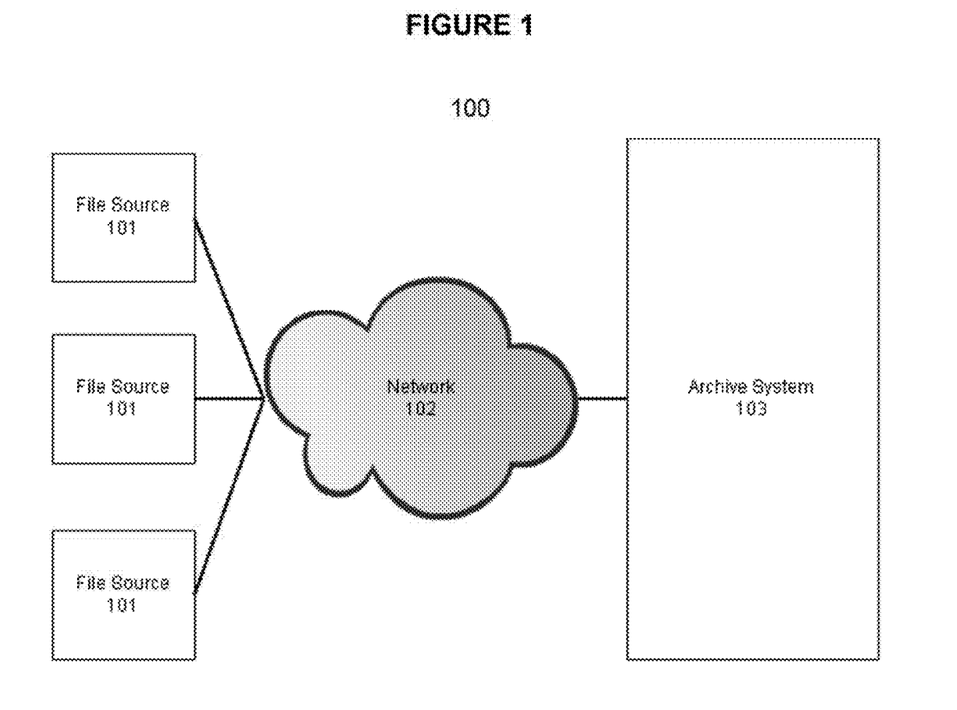
FIG. 1 is a block diagram illustrating generally a networked archival system in accordance with some embodiments of the invention.

FIG. 1 is a general overview of a networked archival system 100 in accordance with some embodiments of the invention. System 100 includes a plurality of file sources 101 coupled to a network 102, which may be the Internet, an intranet, any other suitable network, or a combination of such networks. System 100 also includes an archive system 103 coupled to network 102. File sources 101 may be a computer, smart phone, camera, or other device capable of taking and/or storing photos and of coupling to network 102. File sources 101 may also be capable of creating and/or storing information related to the photos taken or stored thereon. Note that communication between file sources 101, network 102, and archive system 103 may be wired or wireless, and that there may be other devices coupled between file sources 101 and network 102 and between network 102 and archive system 103. Note also that the number of file sources 101 may be more or less than that shown.

Figure 2:
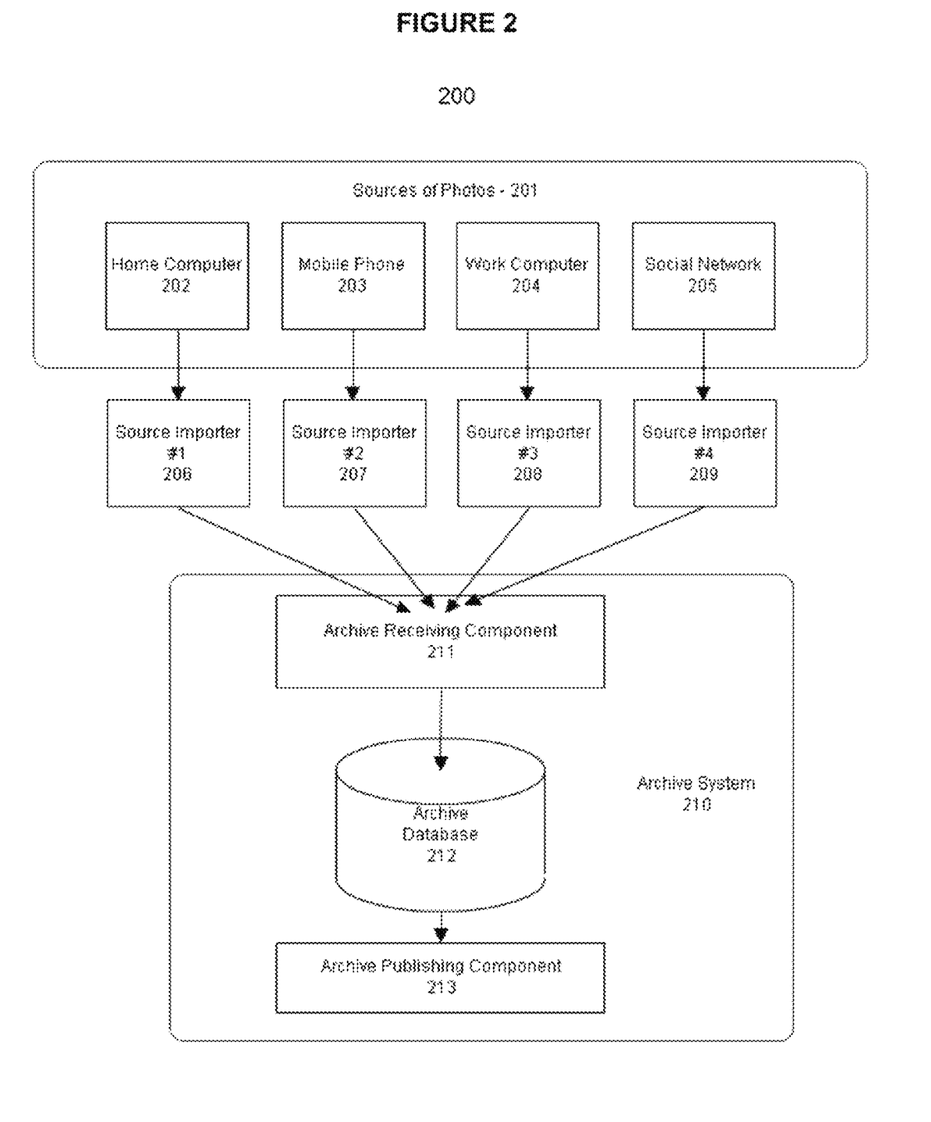
FIG. 2 is another block diagram illustrating an embodiment of an archival system according to some embodiments of the invention.

FIG. 2 illustrates a more detailed embodiment of the invention. Photos and their related information may be collected from any one or all of a plurality of sources 201, such as a home computer 202, mobile phone 203, work computer 204, and/or online photo sharing service or social network 205. Note that the number and types of sources 201 can be more or less than that shown in FIG. 2. Photos and their related information can be transferred from sources 201 via software referred to herein as a "source importer." An instance of a source importer can be allocated for each source 201 (e.g., source importers 206, 207, 208, and 209). Each instance of source importer software can run at the source or as an agent running as part of the service that fetches the photos to be archived. The former may be referred to as a "push source importer" and the latter may be referred to as a "pull source importer." Source importers can transfer photos and related information from sources 201 to archive system 210, which includes archive receiving component 211, archive database 212, and archive publishing component 213. Note that between each source 201 and respective source importer and/or between each source importer and archive system 210 can be an authentication layer (not shown) to ensure that each user/customer is appropriately identified, given the appropriate access, and the like. Note also that a "network cloud" is not shown in FIG. 2 for clarity purposes, and one or more networks may be used to connect between any one source 201 and a source importer, between any one source importer and archive system 210, or between any combination(s) thereof.

Figure 3:
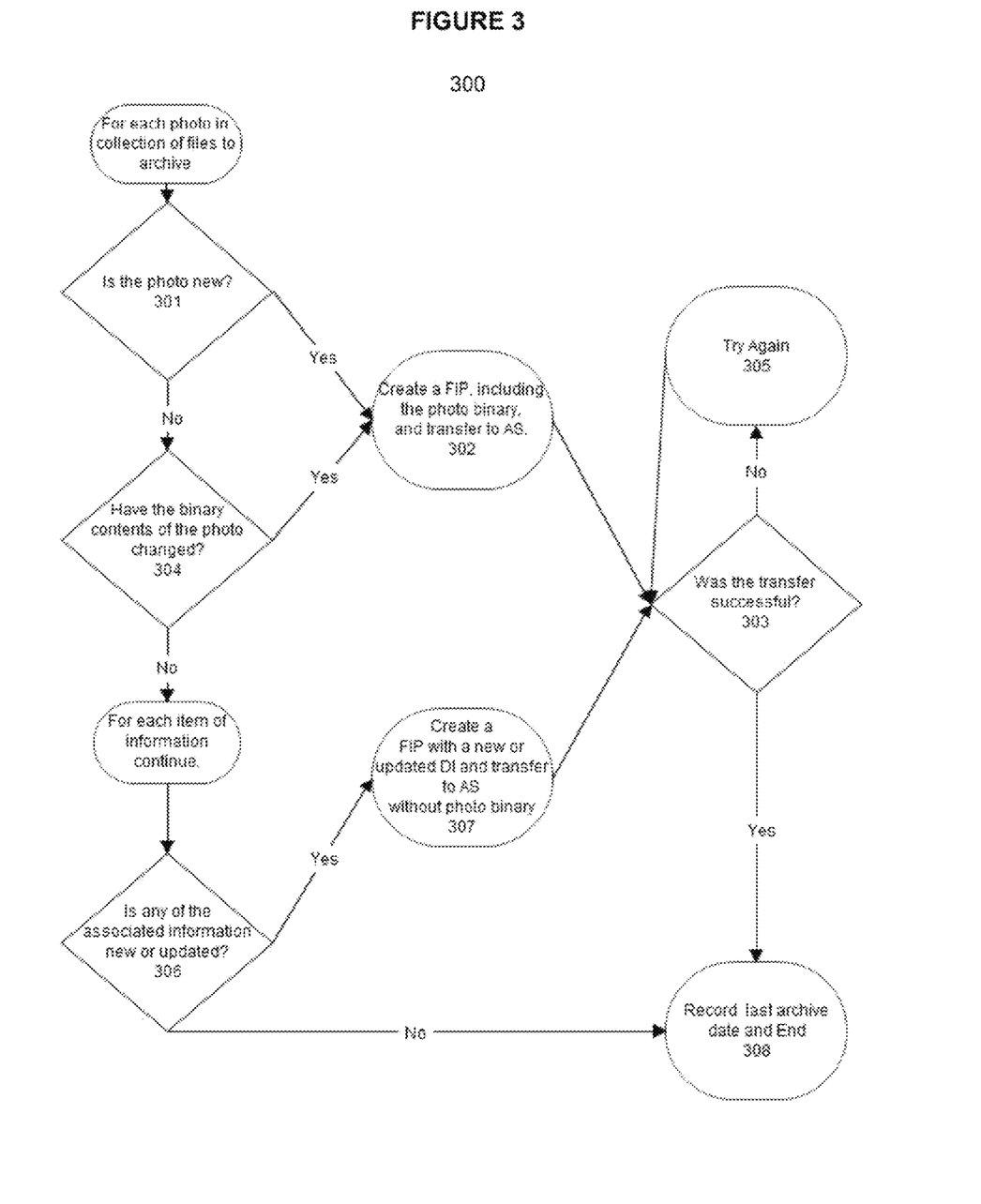
FIG. 3 is flowchart illustrating an example process of an embodiment of a source importer according to some embodiment of the invention.

FIG. 3 illustrates an example of a process 300 that can be used for a source importer in accordance with some embodiments of the invention, in some embodiments, source importers (such as, e.g., source importers 206, 207, 208, and 209) can be configured to only send to the archive system photos and/or related information that are new to the archive system. Alternatively, in some embodiments, the source importers can be configured to send every photo and/or piece of related information designated by a user to the archive system (which can then determine whether any of the received items are duplicates).

Figure 4:
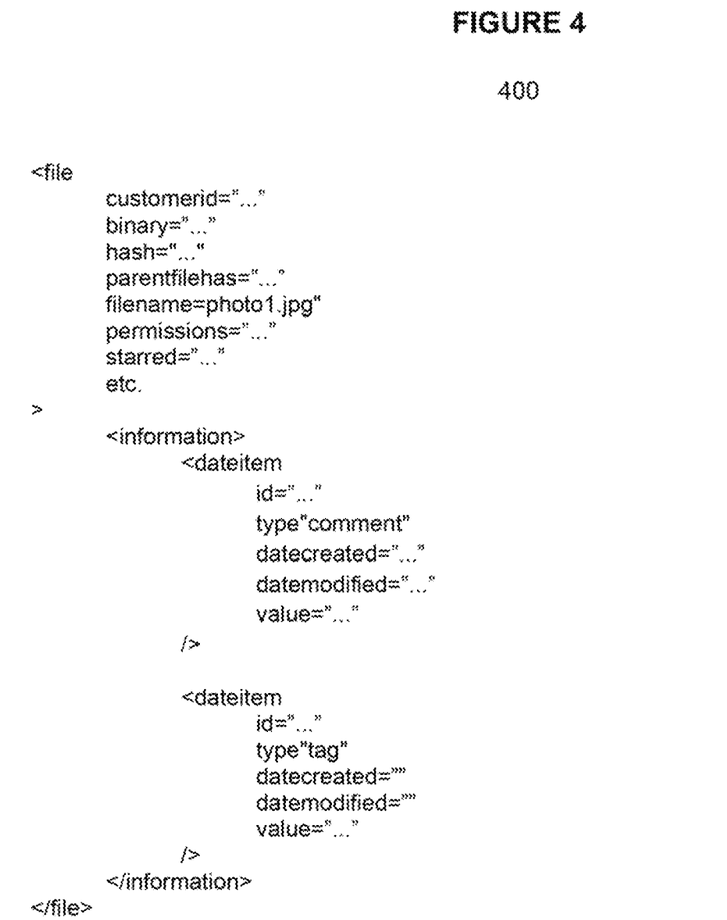
FIG. 4 illustrates an embodiment of an XML structure showing the format and types of information that may be contained in a file-and-information package according to some embodiments of the invention.

As shown in FIG. 3, for each photo to be sent to the archive, process 300 can identify whether the photo is new at 301. If the photo is determined to be new, process 300 can package the photo and its related information into a larger file referred to herein as a file-and-information package ("FIP") at 302. The FIP may have a structured format, which may be in, for example, JSON (JavaScript Object Notation), XML (Extensible Markup Language), and/or any other suitable format. Each piece of information may be added to the FIP as a data item ("DI"). FIG. 4 shows an example of an FIP 400 in XML. The FIP can then also be sent to the archive receiving component at 302. At 303, process 300 can determine if the FIP was successfully received, and, if so, the archive system can record the date and time of the successful archiving at 308. If the FIP transfer was determined to not be successful at 303, the transfer can automatically be attempted again a preset number of times at 305.

If it is determined at 301 that the photo has already been archived, process 300 can then determine if photo's binary contents have changed at 304. If so, process 300 can branch to 302 to add the new binary to a FIP and transfer the FIP to the archive system. In some embodiments, identifying changes in the binary content may be accomplished by associating a hash with each photo and comparing the hashes of photos at a source importer with photos in the archive. If a photo's hash has changed, the photo's binary contents can be assumed to have changed.

In some embodiments, if it is determined that a photo's binary contents have changed (or the photo's hash has changed), the new FIP can include the hash of one or more related photos such as the photo from which the current photo was derived). The archive system can then associate the new photo with an existing archive database photo entry as a "child" thereof. Every binary version of a photo can be archived and the parent-child relationship recorded in some embodiments. Users/customers can then have a backup of original photos as well as archived edited versions of those photos.

If it is determined at 304 that the binary of a photo has not changed, then, for each piece of information for the photo, process 300 can determine whether information for the photo is new or has been updated at 306. If the information is new or updated, process 300 can create a FIP (e.g., as described in connection with step 302) and transfer that FIP to the archive system at 307 and then branch to 303. Otherwise process 300 can set the archive for the photo to the current date and time at 308.

Information about a photo can be packaged such that the type of information represented by the data is identified. For example, comments may be labeled as "type=comment." This can allow archive system 210 to store similar types of information from different sources as the same type of information.

Figure 5:
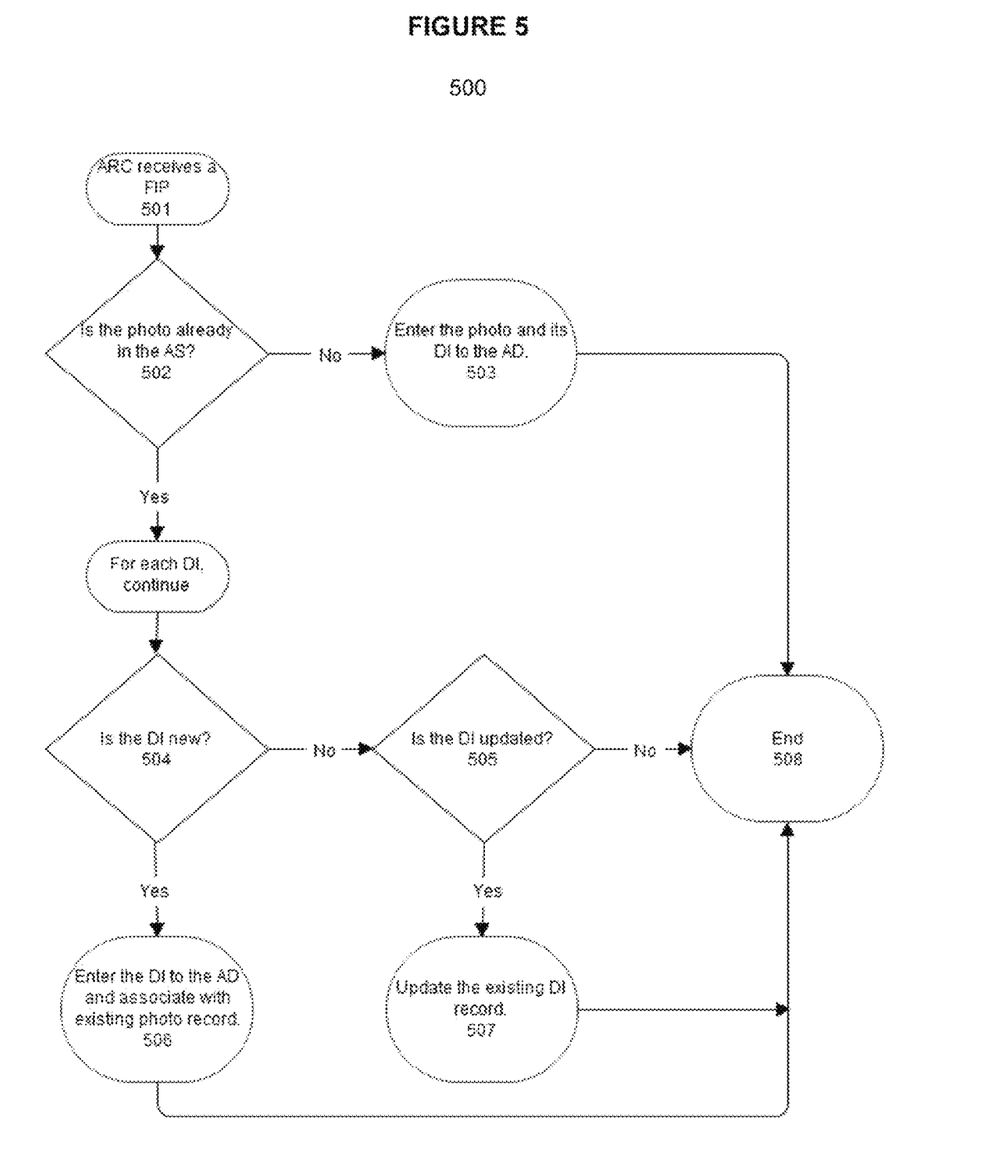
FIG. 5 is a flowchart illustrating an example process of an embodiment of an archive receiving component according to some embodiments of the invention.

FIG. 5 illustrates an example of a process 500 that can be used for an archive receiving, component 211 in accordance with some embodiments of the invention. Once a photo and its information, or new information for one or more existing photos, are packaged into a FIP, they may be transferred across a network to archive system 210 and received by a process 500 at 501. Process 500 can then search archive database 212 for preexisting entries to determine whether the received photo is a new entry for the archive or a resubmission of an existing photo at 502. In one embodiment, this identification may be accomplished by comparing a hash of the photo with a hash of every other photo in the archive.

If it is determined at 502 that the photo is not already in the archive, then process 500 can store the photo and each data item in the FIP into the archive at 503 and then end at 508. When being stored, each data item can be associated with the photo in the archive database.

If it is determined at. 502 that the photo is already in the archive, then, for each data item in the FIP, process 500 can determine if the data item has not been previously stored in the archive at 504. If so, then process 500 can store the data item in the archive database and associate with the data item with the existing photo's archive database record at 506 and then end at 508.

Otherwise, if it is determined at 504 that the data item has been previously stored in the archive at 504, then process 500 can determine at 505 if the data item contains updated information. If so, process 500 can then update the appropriate archive database data item record at 507 and then end at 508.

Otherwise, if it is determined at 505 that this data item does not contain updated information, then process 500 can end at 508.

Entries in the archive database can be associated with a unique identifier using any suitable method. In some embodiments, one or more records in the archive database can be associated with a respective user/customer.

In some embodiments, photos and their data items can be viewed and exported by archive publishing component 213.

In some embodiments, a user can interact with component 213 using a Web browser interface. In some embodiments, archive publishing component 213 may reside on an archive system server that can be accessed through a client, such as may be provided on, for example, a tablet device. In some embodiments, archive publishing component 213 may be hosted on a Web site with an export feature that has access to archive database 212 to allow browsing of stored photos and data items.

In some embodiments, the photos and data items can be exported individually, if desired, from archive system 210. The data items can be rendered in an XML file in some embodiments.

In some embodiments, the photos can be exported as a set. Archive publishing component 213 may combine all the photos and XML files for corresponding data item files into a compressed archive file, such as a ZIP file, in some embodiments.

In some embodiments, a user may desire to archive photos stored on a personal computer. The user may install a source importer (as described above) on the personal computer. The source importer may be implemented as constantly running software that the user can identify via a system tray icon or in some other suitable mariner supported by the computer's operating system. To configure the source importer, the user may launch a configuration interface via, for example, a menu that may be made available by clicking the source importer icon. The configuration interface may allow the user to indicate which photos on the personal computer are subject to archiving. The interface may allow the user to indicate individual photos or trees of photo folders.

On a preferably routine schedule, the source importer can scan all of the photos indicated for archiving in some embodiments. In some embodiments of the invention, the source importer can store information for each photo in the scan in a database or text file on the personal computer. The information may include a file name, a byte size, a hash of the file, and/or any other suitable information. The source importer can also store in the local database or text file the unique identifier of the archive database entry for that photo if the photo had been successfully archived before. Note that information stored locally can also ultimately be stored in the archive system of the invention. However, the local storage of this information can allow the source importer to make decisions on the personal computer without having to access the archive system. Note that some embodiments of the source importer may omit this feature, and instead may have to access the archive system to determine the archival status of photos indicated for archiving.

If information regarding a photo to be archived is not already in the local database or text file, the source importer can prepare a FIP and transfers the FIP via, e.g., HTTP (Hypertext Transfer Protocol) or other suitable protocol to an archive receiving component (see 302 in FIG. 3). If the transfer fails, the source importer may retry a set number of times (see 305 of FIG. 3). Upon success, the source importer may record the successful archive date and time in both the local database and the entry in the archive database (see 308 in FIG. 3).

The source importer can store and determine whether a file has ever been archived. It can also store what the hash was at the time of the last archiving, allowing it to determine whether the binary contents of the file have changed (see 304 in FIG. 3).

Figure 6:
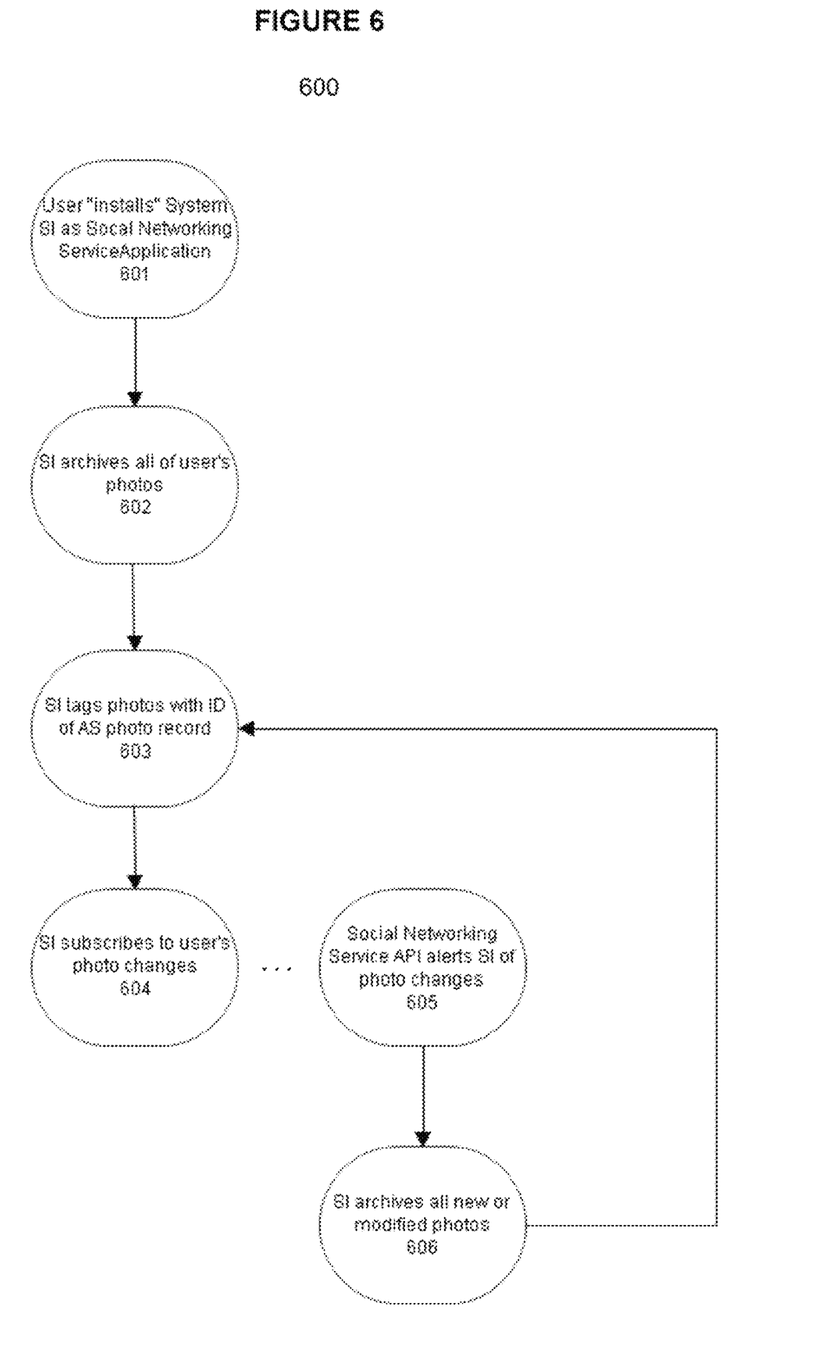
FIG. 6 is a flowchart illustrating an example process of an embodiment of a mechanism for archiving photos and information from a social or image networking service in accordance with some embodiments of the invention.

FIG. 6 illustrates an example of a process 600 of an embodiment of a mechanism for archiving photos and information from a social or image networking service (referred to collectively hereinafter as a "social networking service" or "SNS"). In process 600, at 601, a user may install a source importer (SI) as a social networking application via the social networking service's API (Application Programming Interface). The API may allow third-patty software to operate in conjunction with the social networking software. Note that the source importer software may not actually be installed on any server or device controlled by the social networking service, but may instead be located on, for example, the user's computer, a third-party server or device, or the archival retrieval system of the invention. The source importer software may be able to access the user's information and photos that are stored with the social networking service, along with the photos' comments, tags, and other related information. The user may identify individual photos at archiving, complete albums, indicate their entire collection. The social networking, service APT may provide a method of accessing a list of all the user's photos. At 602, the source importer can archive the user's photos and related information stored with the social networking service as described above in connection with FIG. 3.

Some social networking service APIs may provide a method of labeling photos called "tagging." in some of these cases, the source importer can label a photo with a unique tag once the photo has been successfully archived, at 603. By looking for the presence of this tag, the source importer can determine if the photo has ever been archived (see 301 in FIG. 3). In some embodiments, social networking service APIs may also provide methods for accessing the related information of a photo, such as comments, tags, or placements in a collection called an album. In some embodiments, social networking service APIs may further provide a method to access a Universal Resource Locator (URL) for an original photo. The source importer can use these methods to create a FIP for the photo and transfer it to the archive receiving component of the archive system.

In some embodiments, social networking services do not provide a method for altering the binary contents of a photo, so the photo's binary contents may not change (see 304 in FIG. 3). In these cases, the source importer can still check for new or updated information related to the photos (see 306 in FIG. 3).

Some social networking service APIs can provide a method of accessing the photo's last modification date and time. This date and time can be set to the current date and time if there has been any changes to the existing, related information or if new related information has been created. When a photo and its related information have been successfully archived, the source importer can tag the photo with a tag unique to the archive system at 603. As mentioned above, this can be used to identify photos that have been archived. The tag may also contain the name of the archive system and/or a unique identifier that matches the photo's record in the data item. The unique identifier may be an incrementing primary key from the data item. An example of a unique identifier from the database may look like "1caab5c3b3." A hexadecimal number with ten digits such as this can be used to uniquely identify billions of photo records. An example of a tag may be something like or similar to "SystemName—1caab5c3b3."

The unique identifier in the data item can be matched to the photo's hash and the last successful archive date as stored in the archive system (see 306 of FIG. 3). If the photo's last modification date indicated by the social networking, service API is after the last successful archive date of the photo, the source importer can create a FIP to submit the new or updated related information to the archive receiving component (see 307).

If the photo had already been tagged by the archive system, the actual photo file binary does not have to be transferred again to the archive (see 307).

In some embodiments, because the archive receiving component does not create duplicate entries for submission with the same binary content, the archive database can be configured to contain only one entry for every unique photo the user has uploaded to the social networking service. If the user has uploaded the same photo multiple times to the social networking service, the archive database may still contain only one entry and associate all the comments and other related information from the multiple social networking service photos to the one archive entry.

For some social networking services, the source importer does not need to run on a schedule. For example, a social networking service API can provide a method for the source importer to be notified when the user has modified his or her "user" profile and the user's photos, such as when photos have been added or comments entered. After an initial scan and import on installing the source importer as a social networking service application, the archive system may "subscribe" to changes in the user's photos at 604. The social networking service can notify the archive system at 605 by accessing a URL of the archive system with the user's social networking service login identification, which can allow the archive system to activate that user's source importer for the social networking service. The source importer can then scan the user's photos at 606, as described above.

In some embodiments, the source importer does not unnecessarily poll the user's information stored with the social networking service. In some embodiments, the source importer does not transfer the photo binary to the archive receiving component more than once. In some embodiments, duplicate photos stored with the social networking service can be combined into one record in the archive system with all the related information from all of the original duplicates. In some embodiments, newly added related information can be archived in a timely manner.

File source 101, archive system 103, sources of photos 201, and archive system 210 can be implemented using any suitable hardware in some embodiments. For example, in some embodiments, these components can be implemented using any suitable general purpose computer or special purpose computer. Any such general purpose computer or special purpose computer can include any suitable hardware. For example, in some embodiments, such hardware can include a hardware processor, memory and/or storage, etc. Such a hardware processor can include any suitable hardware processor, such as a microprocessor, as micro-controller, digital signal processor, dedicated logic, and/or any other suitable circuitry for controlling the functioning of a general purpose computer or special purpose computer in some embodiments. Such memory and/or storage can be any suitable memory and/or storage for storing programs, data, measurements, etc, in some embodiments. For example, the memory and/or storage can include random access memory, read only memory, flash memory, hard disk storage, optical media, etc.

In some embodiments, any suitable computer readable media can be used for storing instructions for performing the functions and/or processes described, herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claim which follows. Features of the disclosed embodiments can be combined and rearranged in various ways.

What is claimed is:

1. A system for archiving digital photos in a digital photo archive, comprising:
   at least one hardware processor that:
   collects a plurality of photos from a plurality of sources;
   collects a plurality of pieces of information relating to one of the plurality of from the plurality of sources, wherein at least two of the plurality of pieces of information are from different ones of the plurality of sources;
   translates the plurality of pieces of information from the different ones of the plurality of sources into a common format;
   determines whether the one of the plurality of photos is presently stored in the archive;
   stores the one of the plurality of photos in the archive with the plurality of pieces of information in the common format only if the one of the plurality of photos has been determined to not be presently stored in the archive;
   indicates to a user that the one of the plurality of photos is a duplicate photo if it is determined that the one of the plurality of photos has been determined to be presently stored in the archive;
   determines when the plurality of sources contain at least one of a new piece of information and a change in a piece of information related to the one of the plurality of photos; and
   stores in the digital photo archive the at least one of the new piece of information and the change in the piece of information with the one of the plurality of photos that was previously stored in the digital photo archive in response to determining that the plurality of sources contain the at least one of the new piece of information and the change in the piece of information related to the one of the plurality of photos.

2. The system of claim 1, wherein the at least one hardware processor also:
   receives a user identification of a of source of photos to be archived;
   monitors the source of photos to be archived for changes in photos available from the source of photos; and
   archives photos from the source of photos based on the changes.

3. The system of claim 1, wherein at least one of the plurality of sources is a social media account.

4. The system of claim 1, wherein at least one of the plurality of sources is a folder.

5. The system of claim 1, wherein at least one of the plurality of sources is cloud-based storage.

6. A method for archiving digital photos in a digital photo archive, comprising:
   collecting a plurality of photos from a plurality of sources;
   collecting a plurality of pieces of information relating to one of the plurality of photos from the plurality of sources, wherein at least two of the plurality of pieces of information are from different ones of the plurality of sources;
   translating the plurality of pieces of information from the different ones of the plurality of sources into a common format;
   determining whether the one of the plurality of photos is presently stored in the archive;
   storing the one of the plurality of photos in the archive with the plurality of pieces of information in the common format only if the one of the plurality of photos has been determined to not be presently stored in the archive;
   indicating to a user that the one of the plurality of photos is a duplicate photo if it is determined that the one of the plurality of photos has been determined to be presently stored in the archive;
   determining when the plurality of sources contain at least one of a new piece of information and a change in a piece of information related to the one of the plurality of photos; and
   storing in the digital photo archive the at least one of the new piece of information and the change in the piece of information with the one of the plurality of photos that was previously stored in the digital photo archive in response to determining that the plurality of sources contain the at least one of the new piece of information and the change in the piece of information related to the one of the plurality of photos.

7. The method of claim 6, further comprising:
   receiving a user identification of a of source of photos to be archived;
   monitoring the source of photos to be archived for changes in photos available from the source of photos; and
   archiving photos from the source of photos based on the changes.

8. The method of claim 6, wherein at least one of the plurality of sources is a social media account.

9. The method of claim 6, wherein at least one of the plurality of sources is a folder.

10. The method of claim 6, wherein at least one of the plurality of sources is cloud-based storage.

11. A non-transitory computer-readable medium containing computer-executable instructions that, when executed by a processor, cause the processor to perform a method for providing a digital photo archive, the method comprising:
   collecting a plurality of photos from a plurality of sources;
   collecting a plurality of pieces of information relating to one of the plurality of from the plurality of sources, wherein at least two of the plurality of pieces of information are from different ones of the plurality of sources;
   translating the plurality of pieces of information from the different ones of the plurality of sources into a common format;
   determining whether the one of the plurality of photos is presently stored in the archive;
   storing the one of the plurality of photos in the archive with the plurality of pieces of information in the common format only if the one of the plurality of photos has been determined to not be presently stored in the archive;

indicating to a user that the one of the plurality of photos is a duplicate photo if it is determined that the one of the plurality of photos has been determined to be presently stored in the archive;

determining when the plurality of sources contain at least one of a new piece of information and a change in a piece of information related to the one of the plurality of photos; and storing in the digital photo archive the at least one of the new piece of information and the change in the piece of information with the one of the plurality of photos that was previously stored in the digital photo archive in response to determining that the plurality of sources contain the at least one of the new piece of information and the change in the piece of information related to the one of the plurality of photos.

12. The non-transitory computer-readable medium of claim 11, wherein the method further comprises:

receiving a user identification of a of source of photos to be archived;

monitoring the source of photos to be archived for changes in photos available from the source of photos; and archiving photos from the source of photos based on the changes.

13. The non-transitory computer-readable medium of claim 11, wherein at least one of the plurality of sources is a social media account.

14. The non-transitory computer-readable medium of claim 11, wherein at least one of the plurality of sources is a folder.

15. The non-transitory computer-readable medium of claim 11, wherein at least one of the plurality of sources is cloud-based storage.

* * * * *

UNITED STATES PATENT AND TRADEMARK OFFICE
CERTIFICATE OF CORRECTION

PATENT NO. : 9,128,958 B2  Page 1 of 1
APPLICATION NO. : 13/681846
DATED : September 8, 2015
INVENTOR(S) : Sean T. Conrad It is certified that error appears in the above-identified patent and that said Letters Patent is hereby corrected as shown below:

In the claims

Column 9, Claim 1, line 24, "one of the plurality of from" should be -- one of the plurality of photos from --.
Column 10, Claim 11, line 55, "one of the plurality of from" should be -- one of the plurality of photos from --.

Signed and Sealed this
Ninth Day of February, 2016

Michelle K. Lee
*Director of the United States Patent and Trademark Office*